United States Patent Office 2,887,497
Patented May 19, 1959

2,887,497

PREPARATION OF TRIMELLITIC ANHYDRIDE

William Hodes, Stamford, Conn., assignor to Standard Oil Company, Chicago, Ill., a corporation of Indiana No Drawing. Application May 27, 1957
Serial No. 661,591

4 Claims. (Cl. 260—346.3)

This invention relates to the preparation of trimellitic anhydride and particularly essentially pure trimellitic anhydride from trimellitic acid.

Trimellitic anhydride may be made by heating of trimellitic acid at elevated temperature and very low pressures. However, in the absence of dehydrating agents in large amounts such production is slow and the product is of low purity. Further the product is usually highly colored from the presence of decomposition materials. Many methods of preparing the anhydride have been devised which attempt to avoid decomposition and color formation but in general these processes have the disability of using large amounts of dehydrating agents or expensive inert solvents or azeotroping agents; in general these methods are not simple and are of little value for commercial production.

An object of the invention is the preparation of trimellitic anhydride from trimellitic acid. A particular object is a process for the preparation of trimellitic anhydride from trimellitic acid which produces essentially pure anhydride product. A further object is a process of anhydride preparation by heating trimellitic anhydride which uses only tiny amounts of dehydration promoter. Other objects will become apparent in the course of the detailed description.

It has been discovered that trimellitic acid can be converted in extremely high yield to high purity trimellitic anhydride by heat treatment at a temperature and pressure such that trimellitic anhydride passes off in the vapor phase when acetic anhydride is present in the charge to the treating zone. The acetic anhydride is present in an amount between about 0.1 and 3 weight percent based on trimellitic acid charged. More usually the usage of trimellitic acid will be between about 0.5 and 1.5 weight percent based on trimellitic acid charged.

The trimellitic acid charged to the heating zone may be of high quality with respect to metallic impurities or presence of other isomeric acids. The process is entirely operable when charging trimellitic acid which contains considerable amounts of metallic impurities used in the oxidation of trialkylbenzenes to the corresponding benzene carboxylic acids. The trimellitic acid and acetic anhydride are essentially the only materials charged to the treating or heating zone; the remainder of the materials are only those impurities normally present in crude trimellitic acid or present in technical grade acetic anhydride.

It is to be understood that while the acetic anhydride is present at the initial heating of the charge to the treating zone it is not present throughout the dehydration operation. Under the temperature and pressure conditions needed for the formation of the trimellitic anhydride the acetic anhydride or acetic acid product passes overhead with the initial production of vapors from the treating zone; usually the acetic anhydride or acetic acid is recovered in the condensation trap protecting the vacuum system commonly used in the treatment.

The trimellitic acid and the acetic anhydride may be charged separately to the heating zone or may be intermingled prior to introduction into the zone. The heating of the trimellitic acid in the heating zone may be begun before the introduction of the acetic anhydride but acetic anhydride must be present before the temperature has reached a point where acetic anhydride would be rapidly vaporized and removed from said zone. It is preferred to introduce the trimellitic acid and acetic anhydride substantially simultaneously into the treating zone.

The treating or heating zone is brought to a temperature and pressure relationship such that the trimellitic anhydride vapors produced pass off in the vapor phase; these vapors are condensed to recover the trimellitic anhydride produced in the treating zone. In general, the time-pressure relationship in the heating zone is between about 180° C. when the pressure therein is about 0.1 mm.Hg and about 220° C. when the pressure therein is about 10 mm.Hg. Somewhat higher temperatures may be used when higher pressure operation is desired but higher temperatures tend to introduce decomposition problems which result in discolored product. It is preferred to carry out the heating zone treatment at a temperature between about 185°–195° C. with the pressure maintained between about 0.5 and 1 mm. Hg.

The precise operation of the heating or treating zone is dependent upon the quality of trimellitic acid charge. When the trimellitic acid is of high purity trimellitic anhydride product is produced almost immediately and is recoverable from the condensing zone. It is to be understood that the condensing zone is operated under such conditions that the acetic anhydride and acetic acid and water produced do not condense along with the trimellitic anhydride. The heating is continued until substantially all the acid has been dehydrated that is possible to dehydrate without introducing decomposition, i.e., it is usual to have some small wastage of acid in the treating zone. In the case of crude trimellitic acid charged there is generally some immediate evolution of low boiling materials produced from the impurities present in the acid. The condensing zone is operated to eliminate these lower boiling materials prior to the production of substantially pure trimellitic anhydride. If the purity of the trimellitic anhydride is of no primary importance some of these low boiling materials may be condensed along with the trimellitic anhydride. Also when charging crude trimellitic acid a bottoms product of highly colored material will be present in the treating zone and heating should be stopped before the impurities present in the bottoms decompose to produce highly colored materials that lower the color quality of the trimellitic anhydride in the condensing zone.

The effectiveness of the process of the instant invention in producing substantially pure trimellitic anhydride from either high quality trimellitic acid or crude trimellitic acid is illustrated by the following working examples.

The process in general will be operated in a batch manner, however, the process may be operated in a continuous manner. In a continuous operation the trimellitic acid and acetic anhydride charged will pass through a preheating zone at a temperature and time sufficient to initiate the dehydration reaction before the acetic anhydride has been distilled away. The preheated charge is then passed into a heating zone maintained at the desired temperautre and pressure relationship; this heating zone is adapted to permit continuous withdrawal of trimellitic anhydride vapors along with removal of bottoms materials. The heating zone may be a vessel providing the necessary holding time with a bottoms drawoff of by-product and some unconverted acid or it may be a continuous tube type operation wherein the acid is substantially completely converted before the emergence of material from the tube.

It is to be understood that these working examples do not limit the scope of the invention as variations therefrom may be readily devised.

Example I

The apparatus consisted of a glass round-bottom flask provided with a side-arm tube and a thermometer opening; this flask was heated by an electrical heater. The side-arm led to a two-necked flask, which was cooled with water. A vacuum pump was connected to one neck; this pump could maintain a vacuum of 0.5 mm. Hg on the system.

In this run 220 g. of good quality trimellitic acid and 2 ml. of acetic anhydride were charged to the heated flask. The system was evacuated to 1 mm. Hg and heating begun, while the contents were stirred by a magnetic bar means. The flask was maintained at 182–187° C. at 0.6 mm. Hg until 190 g. of product had been collected in the receiver flask. The solid material in the receiver had an ivory color. The product melted at 169–170° C.; the melting point was not changed by recrystallization from benzene-acetone solution. The yield of very high purity trimellitic anhydride was 95% of the theoretical.

Example II

In this run, 220 g. of crude trimellitic acid was charged to the flask. This acid contained 1200 p.p.m. of metals as determined by spark spectra. One ml. of acetic anhydride was added to the flask. The flask was evacuated and heating begun. Operation at 0.9 mm. Hg and 187–193° C. produced 176 g. of white crystalline material. The trap in the system contained 6 g. of a yellow-white solid which contained 8 p.p.m. of metals. The bottoms in the heating flask were black in color and had a phenolic odor—these contained 32,400 p.p.m. of metals. The white crystalline material had a melting point range of 169–171° C. and analyzed 874 Acid Number (the theoretical for trimellitic anhydride is 875). From this crude charge, the yield of pure trimellitic anhydride was 88% of the theoretical amount.

Thus having described the invention, what is claimed is:

1. The process of claim 2 wherein said acetic anhydride is charged in an amount between 0.5 and 1.5 weight percent based on said trimellitic acid.

2. A process for preparing trimellitic anhydride which comprises charging trimellitic acid and acetic anhydride, as essentially the only materials, into a heating zone, said acetic anhydride being charged in an amount between about 0.1 and 3 weight percent based on acid, maintaining said zone at a temperature-pressure relationship between about 180° C. at about 0.1 mm. Hg and about 220° C. at about 10 mm. Hg, passing overhead vapor of trimellitic anhydride produced in said zone to a condensing zone and receiving solid trimellitic anhydride from said condensing zone.

3. The process of claim 2 wherein the vapors lower boiling than trimellitic anhydride are removed from the condensing zone prior to trimellitic anhydride condensation, whereby substantially pure trimellitic anhydride is produced from said condensing zone.

4. The process of claim 2 whereby said trimellitic anhydride vapors are produced at a temperature between about 185°–195° C. and a pressure between about 0.5 and 1 mm. Hg.

References Cited in the file of this patent

UNITED STATES PATENTS 2,753,373   Hutchings et al. _____ July 3, 1956

OTHER REFERENCES

Gardner et al.: Journal of the Chemical Society, 1954 pp. 1817–1819.

Alder et al.: Chemical Abstracts, vol. 47, p. 1654*h* (1954), abstracted from Deutsche Chemische Gesellschaft-Berichte, vol. 85; pages 556–565 (1952).

Ruzicka et al.: Helvetica Chimica Acta, vol. 30, pp. 2168–2198 (1947).

Posternak: Helvetica Chimica Acta, vol. 23, pp. 1046–53 (1940).